Patented Oct. 30, 1923.

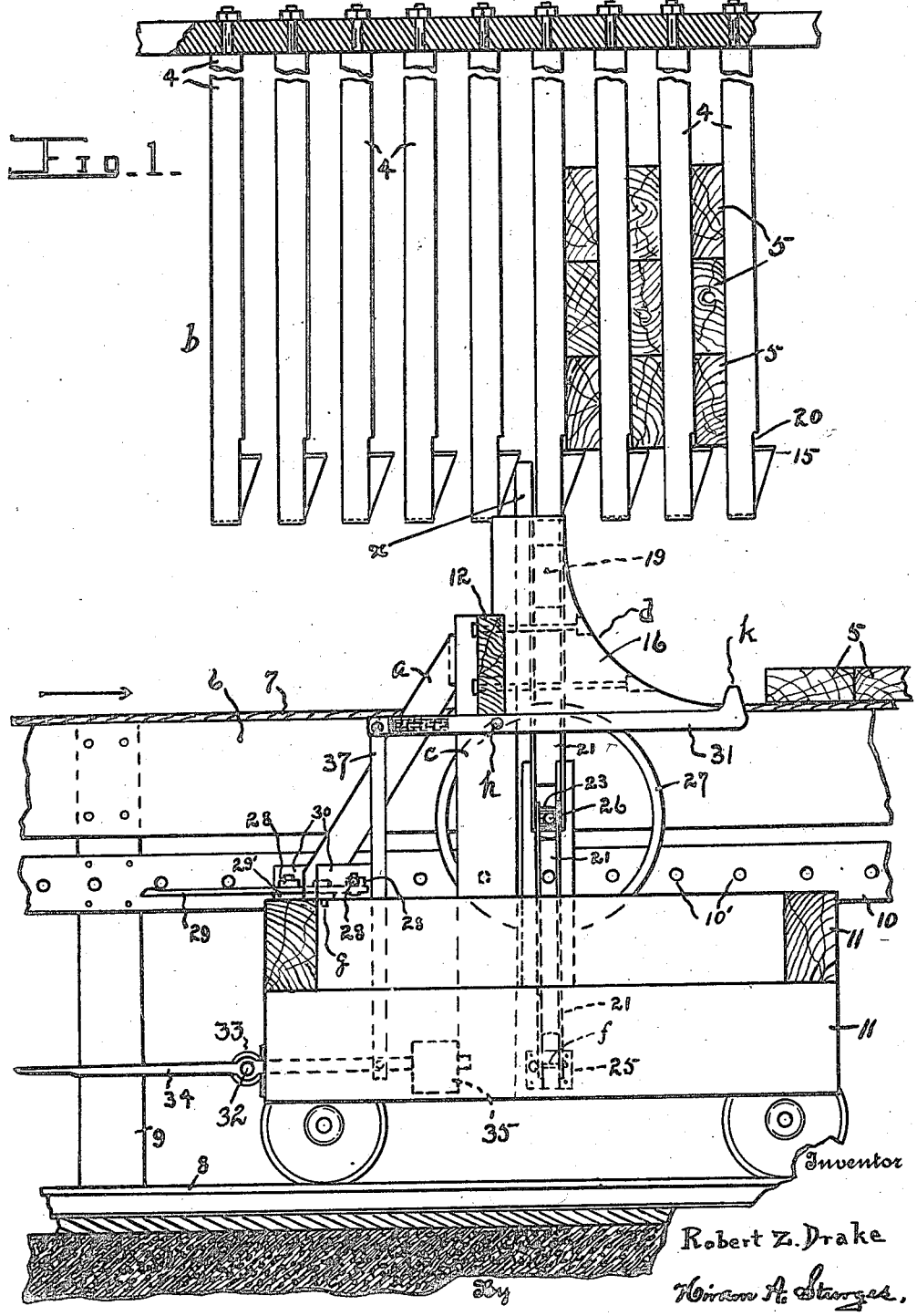

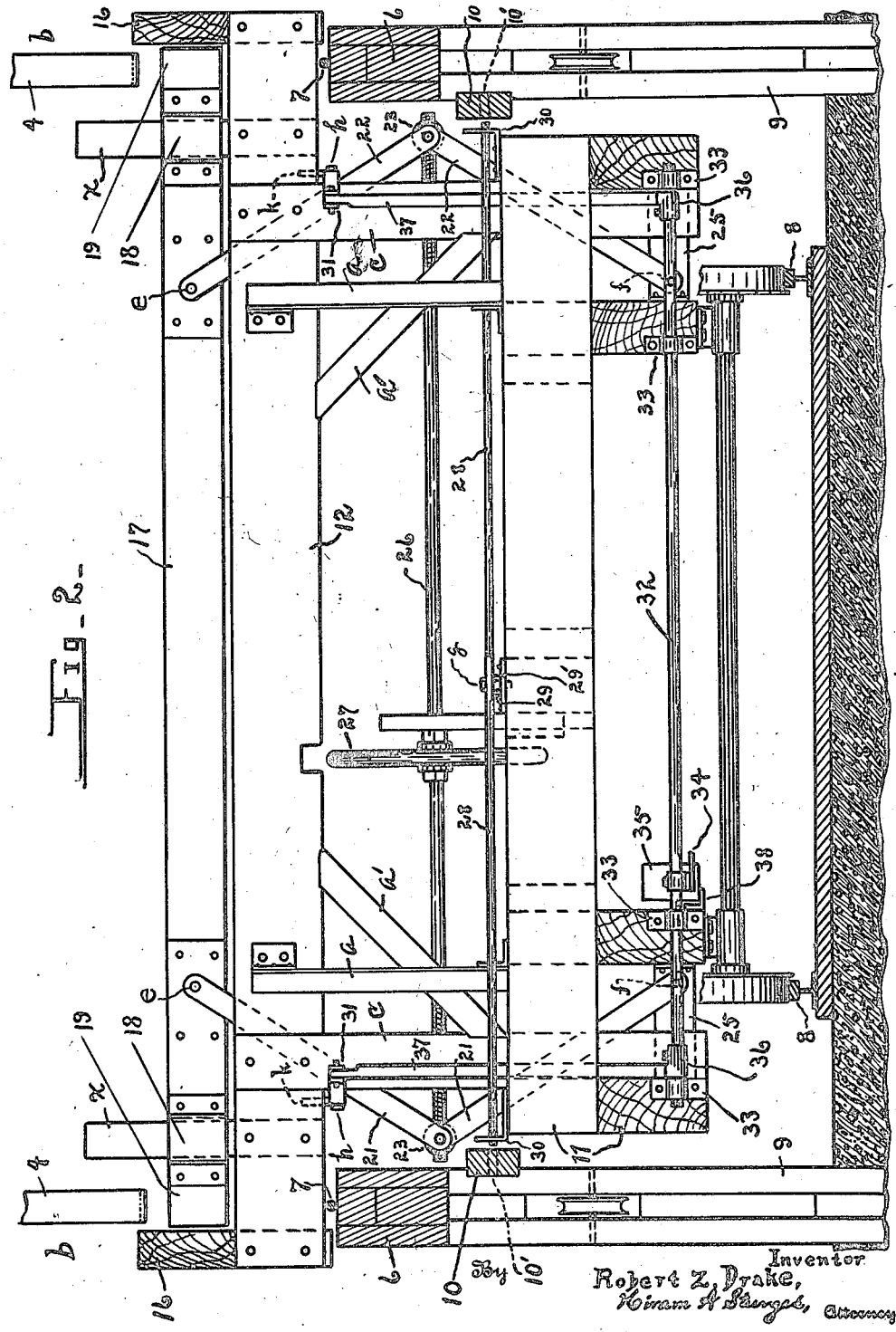

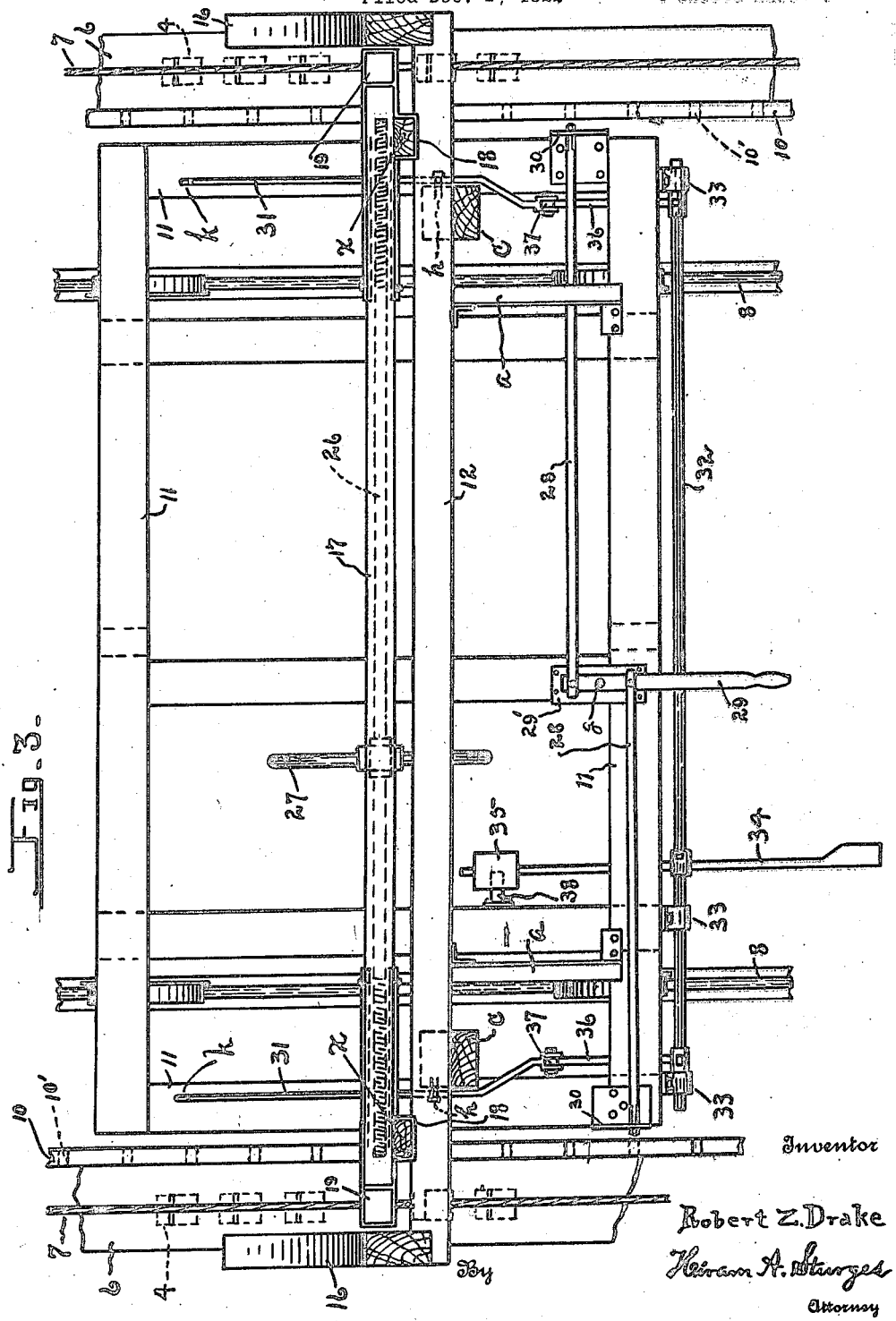

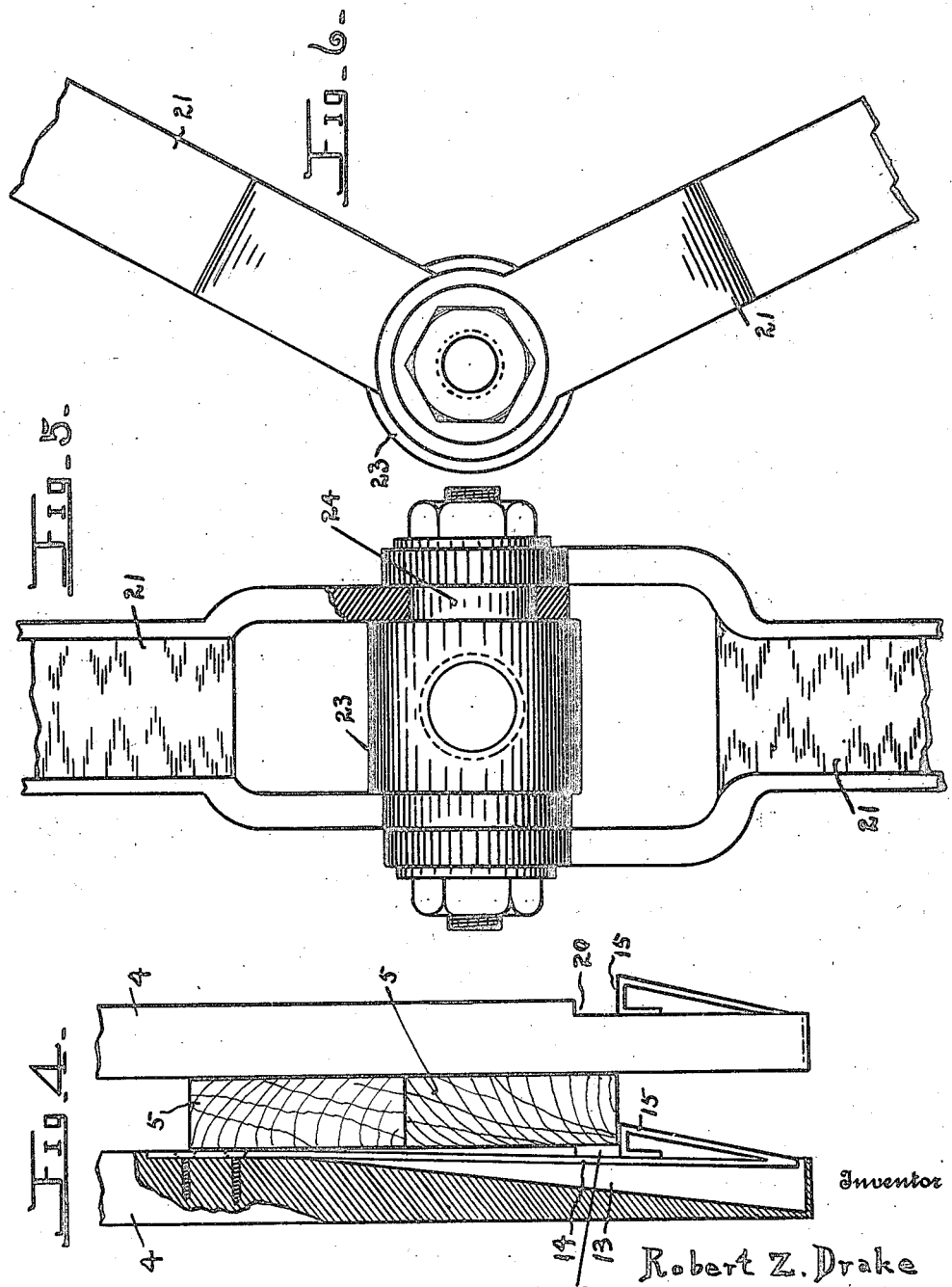

REISSUED AS NO. 16160 SEP 8 1925

1,472,054

UNITED STATES PATENT OFFICE.

ROBERT Z. DRAKE, OF OMAHA, NEBRASKA.

UNLOADING MACHINE.

Application filed December 1, 1922. Serial No. 604,173.

*To all whom it may concern:*

Be it known that I, ROBERT Z. DRAKE, a citizen of the United States, residing at Omaha, in the county of Douglas and State of Nebraska, have invented certain new and useful Improvements in an Unloading Machine, of which the following is a specification.

This invention relates to a machine for use in unloading lumber. While the machine could be used for other purposes, it is particularly useful for unloading lumber from the hanger bars shown and described in U. S. Patent application filed by this applicant Oct. 5th, 1922, for lumber moving and storage means, Ser. No. 592,459. The object of the present invention, broadly, is to provide a machine by use of which, planks, boards or other kinds of lumber may be conveniently and quickly unloaded from the hanger bars and removed from a seasoning house, by a single operator.

The novel and useful features of the invention are fully described herein and in the appended claims, and are illustrated in the accompanying drawings, wherein,—

Fig. 1 is a view of the machine in side elevation, one of the carrier supports at the side of the machine being removed, the machine being shown in connection with a plurlity of hanger bars. Fig. 2 is an end view of the machine, the plates for supporting a pair of carriers being in section. Fig. 3 is a plan view of the parts shown in Fig. 2. Fig. 4 is a sectional view showing the mounting of a catch for a hanger bar. Fig. 5 is a broken view, partly in section, showing the inner ends of a pair of toggle bars mounted on a nut. Fig. 6 is a side view of the toggle-bars shown in Fig. 5.

The invention is described in connection with a plurality of hanger bars 4 adapted to be supported and maintained in a vertical position by any suitable means, said bars having any desired length and arranged in sections $b$ (Fig. 2.), the distance apart for the bars of each section, as shown herein, being nearly equal to the width of the machine, and the distance apart of the bars of one section from the bars of an adjacent section being approximately equal to the thickness of the planks 5 or other fabric strips which may be supported by the bars of the sections $b$.

As best shown in Figs. 2 and 3, a pair of stationary, horizontal, parallel plates 6 are provided upon which are disposed movable carriers 7, the latter, in the present instance being cables adapted to be moved by any suitable means in the direction indicated by the arrow shown in Fig. 1. However chains or other flexible members may be substituted for the cables, if desired. A pair of track rails are indicated at 8, and the carrier-plates 6 are disposed in a plane above the track rails and may be supported by any suitable means, the means herein shown being posts 9. Numerals 10 indicate a pair of horizontal, apertured locking-strips which are secured to the posts, at the inner sides thereof, adjacent to the carrier-plates 6.

All of the parts thus described are clearly shown and are fully described in the copending patent application first mentioned, and in said application means are also shown for moving the lumber upwardly, while disposed horizontally, to be supported, with their edges in engagement, by the hanger bars of the several sections $b$.

In order that the lumber, after it has become seasoned, may be removed conveniently and without injury from the hanger bars of the sections $b$ and that the work may be done quickly by a single operator, I provide mechanism, consisting of a carriage or car and parts mounted thereon, now to be described.

The frame 11 of the car may be of any desired construction, having such a width that it may be moved between the carrier-plates 6, and having a skid-supporting plate 12 disposed transversely of the car above the plates 6, and provided with upwardly projecting guides $x$.

It should be explained that each hanger bar 4 is provided with a chamber 13 opening on one of its sides, near its lower end (Fig. 4,) adapted to receive a spring 14, the lower part of the spring being bent upwardly and outwardly to form a catch 15, these parts being of strong construction since the weight of several planks supported by each section $b$ must be sustained by the catches 15. Also it will be understood that a movement of the catches 15 inwardly of the chambers 13 will permit the planks to slide downwardly, from the hanger bars, upon the carriers 7.

Numerals 16 indicate a pair of skid blocks, each being secured to the plate 12, the latter being adequately supported by parts of the machine frame, as by braces $a$ and $a^1$ and by uprights $c$, the skid blocks preferably having concave surfaces $d$ (Fig. 1.) tending to decrease excessive shocks which otherwise might result by the impact of the moving planks when released from the hanger bars of a section $b$, said concave surface also controlling the direction of movement of the released planks.

In order that the planks may be released from the hanger-bars of a section $b$ a movable releasing-plate 17 is employed, said plate being provided with staples 18 for receiving the guides $x$, and provided at each end with a sleeve or socket 19 disposed below and in the plane of a hanger-bar; and it will be understood that if the releasing-plate has an upward sliding movement on the guides $x$ the lower parts of the hanger-bars of a section $b$ may be received by the sockets 19, the latter operating to press the catches inwardly of the chambers 13 for releasing the planks from said catches. Since the catches are formed downwardly convergent they are readily received by the sleeves or sockets.

It will be seen that each hanger-bar is provided at one of its sides and lower end with a reduced part or recess 20, and each socket 19 is of such form or proportion that one of its walls will engage in a recess 20 during the movements of the releasing-plate so that the catch will be moved into a recess 13 and that the walls of the socket will not obtrude and will not prevent a free downward sliding movement of the planks.

Any suitable means may be provided for moving the releasing-plate vertically, the means shown herein consisting, in part, of toggle-bars arranged in pairs, indicated at 21 and 22, the inner ends of each pair being pivotally mounted on a nut 23, the latter being provided with trunnions 24 (Fig. 5) for said mounting. The upper toggle-bar of each pair is pivotally mounted, as indicated at $e$ upon the releasing-plate, and the lower toggle-bar of each pair is pivotally mounted, as indicated at $f$ upon a bracket 25, said brackets being secured to the lower part of the machine frame as best shown in Fig. 2.

Numeral 26 indicates an operating shaft having reversely threaded end-portions engaging in the nuts 23 and provided with a hand wheel 27, and it will be understood that an operator by use of the wheel 27 may rotate the shaft in one direction to elevate the releasing-plate for unloading the planks from the hanger-bars of a section $b$, and may cause a rotation of the shaft in a reverse direction for moving the releasing-plate downwardly to its normal position adjacent to the skid-supporting plate 12.

Any suitable means may be provided for maintaining the machine or car in a stationary position during the operation of unloading the planks from the hanger-bars of a section $b$, the means herein shown being a pair of links 28 adapted to engage in the apertures $10^1$ of the locking-strips 10, said links being movable by a hand-lever 29 which is pivoted, as indicated at $g$, between its ends upon a plate $29^1$, apertured brackets 30 being mounted on the machine frame near the strips 10 for supporting said links.

It will be understood that the apertures $10^1$ are formed in the strips 10 at uniform longitudinal intervals thereof, the distance apart for the apertures $10^1$ being equal to the distance apart of the hanger-bars of the several sections $b$ measured from their longitudinal middle; and during operation, after the planks have been unloaded from one section $b$ of hanger-bars, the links, by use of the hand-lever 29 are then removed from the apertures $10^1$. The machine is then moved a limited distance, by any suitable means, in the direction indicated by the arrow shown in Fig. 1, to permit the links 28 to engage in apertures $10^1$ next adjacent to those from which the links were removed, the sockets or sleeves of the releasing plate 17, by this operation, being disposed in the vertical plane of the hanger-bars of a section $b$ which has not been unloaded; and when thus disposed the releasing-plate may be elevated for unloading the planks therefrom.

It will be appreciated that in some instances, disengagement of the catches of the hanger-bars of a section $b$ from the lowermost plank may not be simultaneous, one end being detained while the opposite end is moving. Also it is desirable that the planks when engaged by the carriers should be disposed at right-angles thereto. Any suitable means may be employed for controlling the movements of the planks which slide downwardly for engaging the carriers and to cause the planks to be disposed at right-angles to said carriers, the means shown herein consisting, in part, of a pair of stop-levers 31, these levers being disposed inwardly of and near a skid-block 16, and each being pivotally mounted between its ends, as indicated at $h$, upon an upright $c$ of the machine frame, said levers being provided at their front ends with projections $k$.

The stop-levers 31 are adapted to have swinging movements to dispose their projections $k$ in a plane above the carriers 7 for engagement with the planks when the latter are released from the hanger-bars; also, under control of an operator, the levers 31 may have coincident swinging movements to dispose their projections $k$ in a plane below the carrier 7 to permit the planks, thus released, to be moved by said carriers.

Numeral 32 indicates a horizontal shaft having bearings in brackets 33 which are secured to the machine frame, said shaft being provided with a foot-lever 34 for its rotation in one direction, and provided with a weight-block 35 normally causing it to rotate in an opposite direction. Arms 36 (Fig. 3.) are rigidly mounted on this shaft, and a pair of upright links 37 are employed, each being pivotally connected at its ends with a stop-lever 31 and an arm 36, and as described, the weight-block 35 operates to swing the free ends of the stop-levers upwardly with its projections normally disposed above the plane of the carriers 7; and a downward movement of the foot-lever 34 will move the levers 31 to cause the projections $k$ to be disposed in a plane below the carriers 7. Numeral 38 (Figs. 2, 3,) indicates a bracket which may support the weight-block 35 and which operates to limit the upward swinging movement of the front ends of the stop-levers and their projections $k$.

The parts thus described, while of simple construction, cooperate to great advantage for unloading the planks. When the operating-shaft 26 is rotated in one direction the toggle-bars will move inwardly upon the shaft 26, the nuts 23 moving therewith to cause the releasing-plate to move upwardly, its staples 18 sliding on the guides $x$ until the lower ends of the hanger bars of a section $b$ are received by the sleeves 19, one of the walls of each sleeve entering a recess 20 of a hanger-bar, a further upward movement of the releasing-plate causing disengagement of the catches from the plank, the result being that all of the planks supported by the hanger bars of said section will slide downwardly, the lowermost plank being caught by the projections $k$ of the stop-levers 31, which operates to terminate, temporarily, any further movement of the planks, and operating to dispose the planks at right-angles to the carriers 7.

The operator then, by use of the foot-lever 34, causes disengagement of the projections $k$ from the plank, and all of the planks thus unloaded will engage and will be conducted by the carriers 7.

The machine is then moved forwardly to the next section $b$ of loaded hanger bars, and the operation may be repeated until all of the sections are unloaded, the hand-lever 29 being used, as heretofore explained for causing the links 28 to engage in apertures $10^1$ of the strips 10, to maintain the machine in a stationary position before the releasing plate 17 is moved upwardly.

It will be understood that while the accompanying drawings illustrate the preferred embodiment of the invention, changes may be made and other equivalent means employed than specifically described, said changes and equivalent means to be within the scope of the invention as claimed.

I claim as my invention,—

1. In an unloading machine for loaded hanger bars, said bars being provided with catches for supporting the load, a carriage, a releasing-plate on the carriage movable therefrom to engage the catches for releasing the load.

2. In an unloading machine for a plurality of loaded hanger bars, said bars being provided with resiliently mounted catches for supporting the load, a releasing-plate movable from the carriage to coincidently actuate the catches of said hanger bars for releasing the load.

3. In an unloading machine for loaded hanger bars, said bars being provided with catches for normally engaging the load and the machine being provided with guides, a releasing-plate adapted to slide upwardly on the guides and to engage said catches for disengaging them from the load.

4. In an unloading machine for loaded hanger bars, said bars being provided with catches engaging the load, a carriage below the hanger bars, skid-blocks stationary with the carriage, and a releasing-plate movable from the carriage into engagement with the catches for disengaging said catches from the load to permit the load to move upon the skid-blocks.

5. In an unloading machine for loaded hanger bars, said bars being provided with catches normally in engagement with the load, a carriage below the hanger bars and provided with skid-blocks, a releasing-plate on the carriage, means to maintain the carriage in a stationary position with the releasing-plate disposed in the plane of the hanger-bars, and means for moving the releasing plate into engagement with said catches for disengaging them from the load to permit the load to move upon the skid-blocks.

6. In an unloading machine for loaded hanger-bars, said bars being provided with catches normally engaging the load, a carriage provided with skid-blocks and disposed below the hanger-bars, stop-levers mounted on the carriage each stop-lever having a part normally disposed in a plane above a part of a skid-block, a releasing-plate on the carriage, means for moving the releasing-plate into engagement with the catches for disengaging the catches from the load to permit said load to move upon the skid-blocks, and means for disengaging the stop-levers from the load.

7. The combination with a plurality of upright hanger-bars each being provided near its lower end with a resiliently mounted catch for engaging a load, of a releasing-plate having sleeves disposed in the vertical plane of said bars, and means for moving the plate upwardly, each sleeve receiving an end portion of a bar for disengaging a resiliently mounted catch from the load.

8. The combination with a plurality of upright hanger bars each having a recess opening on its lower end and one of its sides and provided with a chamber opening on said recess, each bar having a resiliently mounted catch normally projecting outwardly of said recess, of a releasing-plate provided with sleeves and adapted to have an upward movement to permit its sleeves to engage in the recesses for moving the catches into the chambers of the hanger bars.

9. The combination with a plurality of upright hanger bars each being provided with a chamber and having a recess opening on its side and lower end and having a convergent, resiliently mounted catch normally projecting outwardly from said recess, of a carriage below said hanger bars, a releasing-plate provided with sleeves and mounted on the carriage, and means for elevating said plate, its sleeves engaging in the recesses of said bars to move the catches into said chambers inwardly of said recesses.

10. The combination with a plurality of upright hanger bars each being provided with a catch member, of a carriage below said bars, a releasing-plate, an operating shaft having reversely threaded end portions, nuts provided with trunnions and mounted on the threaded end portions of the shaft, toggle-bars mounted on the trunnions and pivotally connected with the releasing-plate, toggle-bars mounted on said trunnions and pivotally connected with the frame of the carriage, said shaft being revoluble for actuating the toggle-bars, the releasing-plate moving upwardly for engaging the catch-members of said hanger bars.

11. The combination with a plurality of upright hanger bars each being provided with a catch member for engaging a load, and a pair of supporting plates disposed in a plane below said hanger bars, of a carriage provided with skid-blocks and disposed between the supporting-plates, a pair of carriers movable on the supporting-plates, stop-levers pivotally mounted on the carriage, means for moving the releasing-plate into engagement with the hanger-bars for causing disengagement of the catch-members from the load to permit said load to move upon the skid-blocks into engagement with the stop levers, and means to disengage the stop-levers from the load to permit said load to move upon said carriers.

In testimony whereof, I have affixed my signature in presence of two witnesses.

ROBERT Z. DRAKE.

Witnesses.
ARTHUR H. STURGES,
HIRAM A. STURGES.